United States Patent [19]

Shen et al.

[11] Patent Number: 5,198,653
[45] Date of Patent: Mar. 30, 1993

[54] WIDE FOV RETRO-NULL OUTGOING WAVEFRONT SENSOR

[75] Inventors: Gon Y. Shen, Brookfield; William P. Zmek, Naugatuck; Ker L. Shu, New Milford, all of Conn.

[73] Assignee: Hughes Aircraft Company, Los Angeles, Calif.

[21] Appl. No.: 878,144

[22] Filed: May 4, 1992

[51] Int. Cl.$^5$ .............................................. G01J 1/20
[52] U.S. Cl. ................................. 250/201.9; 356/121
[58] Field of Search ........................... 250/201.9, 216; 359/853, 859; 356/121, 122

[56] References Cited

U.S. PATENT DOCUMENTS

5,124,542 6/1992 Wertheimer .......................... 356/121
5,128,530 7/1992 Ellerbroek et al. .................. 356/121

Primary Examiner—David C. Nelms
Assistant Examiner—K. Shami
Attorney, Agent, or Firm—Wanda K. Denson-Low; Michael W. Sales; Robert A. Hays

[57] ABSTRACT

A wavefront sensor includes a plurality of holographic optical elements (HOEs 50) that are disposed on a surface of a mirror (12) that defines a pupil, each of the HOEs diffracting a portion of an output beam for providing an associated sample beam. An optical wavefront sensor (54) has an input that is optically coupled to each of the sample beams through a low aberration optical train and through a transfer lens (54a) that focuses the sample beams at a focal plane (FP). A detector (54b) is positioned in a plane parallel to and offset from the focal plane (focus-biased) for detecting spot images of the sample beams. Each of the HOEs has a prescribed amount of optical power associated therewith for causing the associated sample beam to be focussed by the transfer lens at the plane of the detector, and further has a prescribed amount of optical tilt associated therewith for compensating for a distortion of the sample beam due to a distortion of the pupil for different FOV angles.

16 Claims, 6 Drawing Sheets

FIG. 6.
FOCUS-BIAS

FIG. 7.
FIELD-BIAS

PHASE: $\phi = \phi\text{ LOCAL} + \phi\text{ GLOBAL} = 2\pi \{\text{COEFF. OF LOCAL } \phi [(y-y_o)^2 + z^2]$ $\text{COEFF. OF LOCAL } \phi (y^2 + z^2) +$ $\text{GLOBAL SPHERICAL ABERRATION } (y^2 + z^2)^2\}$ $y_o$ = CENTER OF HOE

WIDE FOV RETRO-NULL OUTGOING WAVEFRONT SENSOR This invention was made with Government support under Contract No. N60921-88-C-0014 awarded by the United States Navy. The Government has certain rights in this invention.

FIELD OF THE INVENTION

This invention relates generally to optical systems and, in particular, to wavefront sensors for laser beam pointing and control systems.

BACKGROUND OF THE INVENTION

Conventional high energy laser beam pointing and control systems are "narrow" field of view (FOV) systems that require a substantial amount of telescope steering so as to redirect the laser beam from a first point to a second point. As can be appreciated, the greater the distance over which the beam must be steered, the greater is the amount of time required to reposition the beam. When used in, for example, an optical communication system, these characteristics may provide less than optimum system performance. A wide FOV pointing system is desirable at least for the reason that more rapid pointing operations may be performed.

However, the provision of a wide FOV (WFOV) laser beam directing system presents a problem in the operation of an Outgoing Wavefront Sensor (OWS) that is a component of the beam directing system. The OWS, such as a Hartmann-type wavefront sensor, is employed to measure an aberration of a sampled portion of the outgoing wavefront so that aberration correction can be applied. A deformable mirror (adaptive optic) is one conventional technique to correct for an aberration of the outgoing wavefront.

In the Hartmann wavefront sensor, a radiation detector array is employed at a focal plane of a transfer lens to measure a plurality of spot image positions of focussed samples of the outgoing wavefront. If the spot positions deviate from positions associated with a non-aberrated wavefront, then an aberration may be present in the outgoing wavefront. The measured spot image deviations are employed to determine an amount of aberration correction to be applied by the deformable mirror. A plurality of Holographic Optical Element (HOE) diffraction gratings can be employed to sample the outgoing wavefront at a number of locations and to direct the samples to the transfer lens of the Hartmann wavefront sensor.

The aforementioned problem arises in the operation of the wavefront sensor over the WFOV. The desired wavefront shape leaving the beam directing system is that of a plane. The wavefront sensor must measure deviations from this condition. If, while operating over the FOV, the optical path from the out-coupled HOE sample beams to a transfer lens of a detector assembly (i.e., the wavefront sensor relay, or transfer, optical subsystem) itself introduces aberrations to the HOE sample beams, the aberrations being equivalent to a departure from a planar condition, then measurement of the true aberration of the outgoing wavefront is made difficult.

However, due to pupil distortion as a function of field angle, the spots positions pattern also changes, in addition to the change resulting from wavefront aberrations. This problem becomes more pronounced if the FOV of the system is widened, as the pupil distortion is a cubic function of the FOV.

Many prior systems attempt to direct the HOE sample beams through a hole in a secondary mirror. However, this results in extreme difficulties in removing shifts of the entire HOE spot pattern, due to slewing over the FOV. One conventional wide FOV design approach requires a large camera, in conjunction with a transfer lens using an extremely fast F-number of approximately F/1. Another approach employs a set of steering mirrors to reduce the overall spot shifts. In either case, these conventional approaches add significant complexity and/or require a large mass to be positioned behind the secondary mirror.

It is thus an object of this invention to provide a low intrinsic distortion wavefront sensor that provides for accurate wavefront aberration detection over a wide field of view.

It is another object of this invention is to provide a wide FOV laser pointing system having a wavefront sensor that accurately measures an aberration of an outgoing wavefront.

SUMMARY OF THE INVENTION

The foregoing and other problems are overcome and the objects of the invention are realized by a wavefront sensor having a plurality of beam samplers, such as holographic optical elements, that are disposed for diffracting a portion of an optical beam that is incident thereon and for providing a plurality of sample beams. The plurality of holographic optical elements are located at a pupil of an optical system, such as a laser energy directing system.

The wavefront sensor further includes a low aberration optical train or path providing a "retro-null" aspect of the invention, which relays the diffracted sample beams to a detector assembly. As employed herein, a low aberration optical train or path is intended to be an optical train or path having an intrinsic aberration that is less than or approximately equal to an aberration that the wavefront sensor is intended to measure.

In an exemplary embodiment of the system, the retro-null aspect of the invention is realized by making use of and sharing an already extant secondary mirror of a beam expander (BEX). The already extant secondary mirror is employed as a component of the low aberration optical path. A further component of the low aberration optical path is provided by a tertiary mirror, thus completing a three mirror, low aberration optical system.

The wavefront sensor also includes a transfer lens disposed for receiving the plurality of sample beams and focussing the sample beams at a focal plane. Also provided is a detector disposed in a plane parallel to and offset from the focal plane for detecting the focussed sample beams.

In accordance with the invention, each of the holographic optical elements has an optical power associated therewith for causing an associated one of the sample beams to be focussed by the transfer lens at the plane of a focus-biased detector, thereby providing, on the detector, a pattern of well separated and sharply focussed sample beam spot images. Each of the holographic optical elements further has an optical tilt associated therewith for compensating for a distortion of an associated one of the sample beams due to a distortion of the pupil. A combination of the optical power and the optical tilt results in a location of the associated one of the sample beams, at the plane of the detector, being primarily a function of an aberration of the optical beam, and not primarily a function of a distortion of the pupil.

Further in accordance with the invention a wavefront sensor is employed with a laser energy directing system. In an exemplary embodiment, the laser energy directing system includes a three mirror beam expander, the beam expander including a primary mirror, a secondary mirror, and a tertiary mirror. The three mirror beam expander operates over an offset field of view. The primary mirror receives an optical beam from the tertiary mirror via the secondary mirror and provides an output beam. The primary mirror defines a pupil of the system. A plurality of holographic optical elements are disposed on the surface of the primary mirror, each of the holographic optical elements diffracting a portion of the output beam that is incident thereon for providing an associated sample beam. These constitute a Hartmann wavefront sensor, which further includes a low aberration optical train that relays the sample beams to a transfer lens for focussing the sample beams at a focal plane, and a detector disposed in a plane parallel to and offset from the focal plane (focus-biased) for detecting images of the sample beams incident thereon.

In accordance with a further object of the invention, the holographic optical elements are designed to retro-diffract the sampled beams back to the BEX secondary mirror and, in turn, to be reflected by the BEX secondary mirror back through an opposite side of a central hole of the BEX primary mirror.

A separate conic tertiary mirror is provided to collimate the sampled beams that are reflected from the secondary mirror and to image an accessible exit pupil where an OWS steering mirror (OSM) steers the sampled beams to the input of the transfer lens/detector assembly. In this retro-diffract HOE embodiment, there is provided a well-corrected, wide field of view, hybrid 3-element (HOE-BEX.SEC-OTM) system for the outgoing wavefront sensor, by the addition of only one moderately sized conic mirror, the OWS Tertiary Mirror (OTM). As a result, there is provided a wide FOV wavefront sensor optical path having minimized aberration, complexity, and mass.

That is, the outgoing wavefront sensor optical train and the beam expander share the secondary mirror, which is hyperbolic. Furthermore, the transfer mirror is provided for relaying the sample beams that reflect from the secondary mirror to the input of the wavefront sensor. The transfer mirror includes the tertiary mirror having a shape (parabolic) that is similar to the parabolic shape of the tertiary mirror in the beam expander optical path. The low aberration over the field of view of the outgoing wavefront sensor optical paths provides a retro-null characteristic, and results in an optical system that is relatively free of aberrations at the focal plane of the transfer lens. As a result, there is provided a wide FOV wavefront sensor optical path having minimized aberration.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
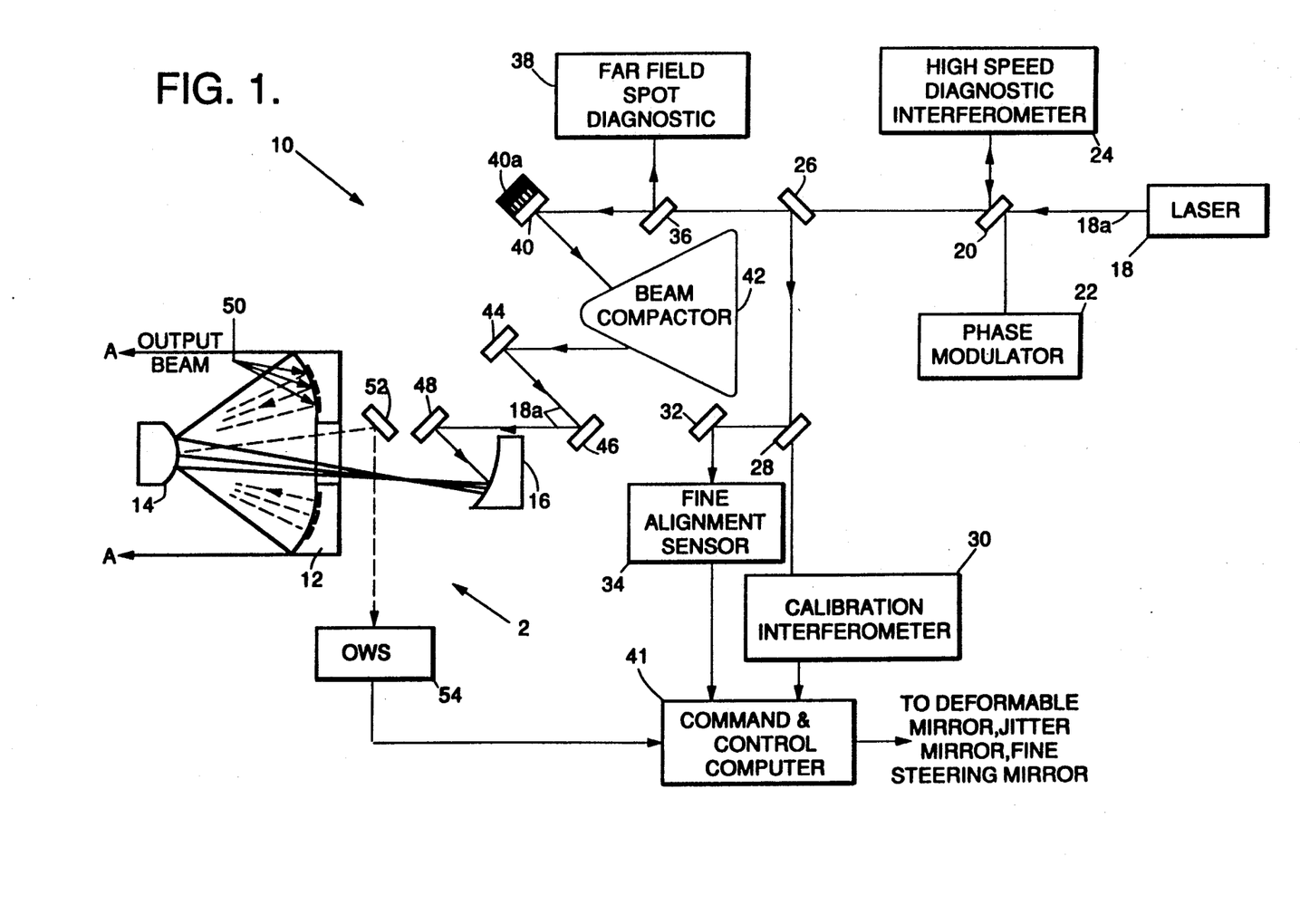
FIG. 1 is a block diagram illustrating a laser pointing system constructed and operated in accordance with the invention.

Referring first to FIG. 1 there is illustrated a laser beam pointing system 10 that is constructed and operated in accordance with the invention. System 10 includes a beam expander (BEX) 2 comprised of a parabolic primary mirror 12 having a centrally disposed aperture 12a, a hyperbolic secondary mirror 14, and a parabolic tertiary mirror 16. The primary mirror 12 is considered to be the aperture stop, or pupil, of the system 10. The BEX 2 expands a laser beam 18a emanating from a laser 18. The output beam of the BEX 2 is indicated by the rays designated A.

By example, in a communication system the laser beam 18a is modulated with information and the modulated beam is transmitted into space as the output beam A. As can be appreciated, any aberration of the output beam A may result in output beam distortion, with a consequent degradation in the information carrying capability of the output beam A.

Interposed between the BEX 2 and the laser 18 are a plurality of optical components. Some of these components are optional and are employed primarily to obtain diagnostic and/or calibration information.

The interposed components include a first beam splitter 20 that samples the laser beam 18a and provides outputs to a phase modulator 22 and a high speed diagnostic interferometer 24. A second beam splitter (dichroic) 26 provides a portion of the laser beam 18a to a third beam splitter 28. Beam splitter 28 provides one output to a calibration interferometer 30 and a second output, via mirror 32, to a fine alignment sensor 34. A fourth beam splitter 36 provides a portion of the laser beam 18a to a far field spot diagnostic unit 38.

System 10 includes a deformable mirror 40 for inducing a compensating aberration into the laser beam 18a under the control of a command and control computer 41. The deformable mirror 40 is a multi-actuator type device wherein each actuator 40a is separately controlled by the command and control computer 41 so as to change the shape of the reflective surface of the mirror 40. The aberration-corrected laser beam 18 is input into a beam compactor 42 which provides an output to a jitter mirror 44. The jitter mirror 44 is a diagnostic device intended to introduce a controlled amount of jitter into the laser beam 18 so as to exercise the fine alignment sensor 34 and a fine steering mirror 46. The laser beam 18a reflecting from the fine steering mirror 46 is provided to a scannable mirror, referred to as a retarget mirror 48, which controllably directs the beam to the input of the BEX 2, that is, to the tertiary mirror 16. Movement of the retarget mirror 48 provides for steering, or pointing, the output beam A in two axes, by changing the angle of incidence of the laser beam 18 on the tertiary mirror 16.

Figure 3:
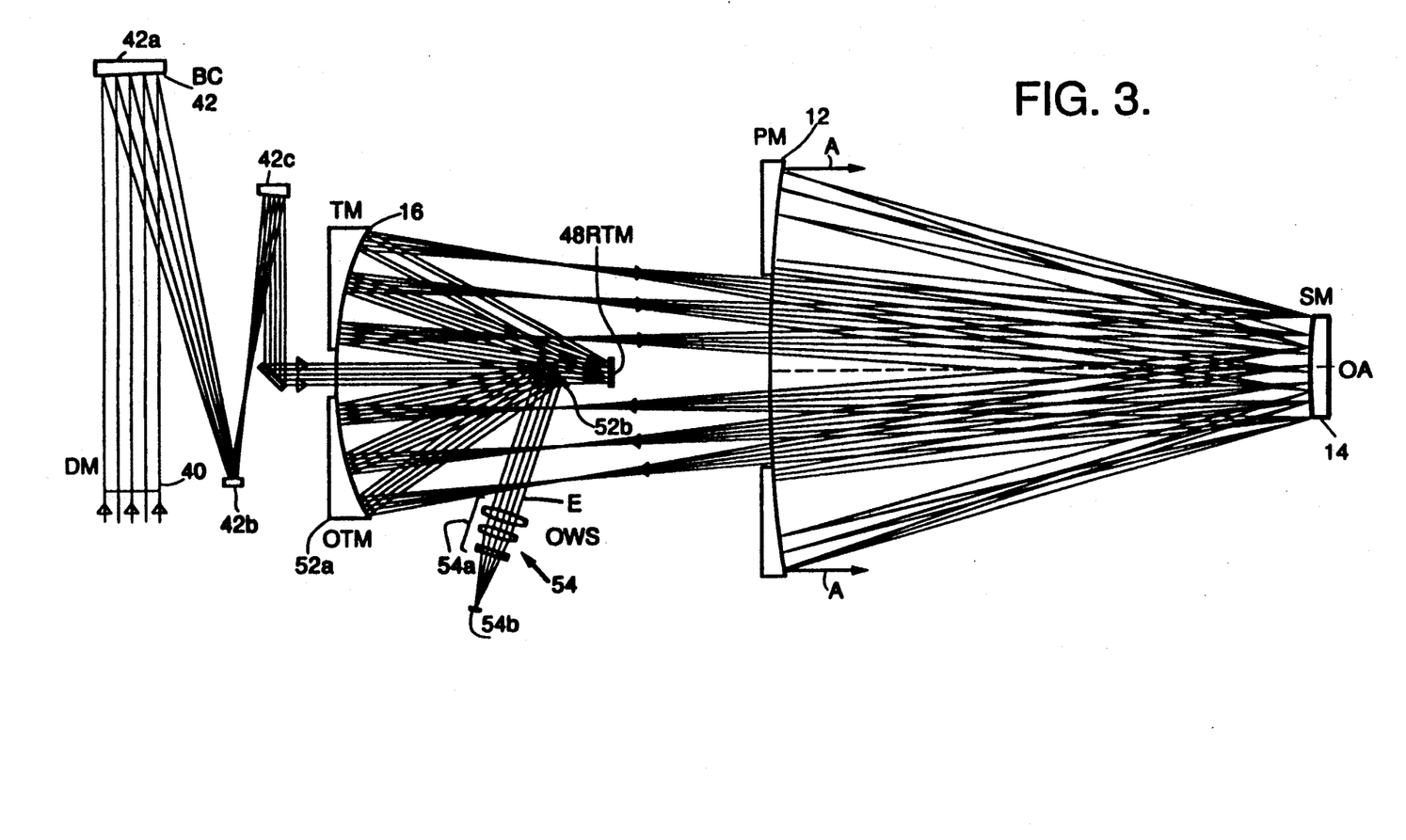
FIG. 3 is a raytrace plot showing an outgoing beam, as in FIG. 2, and further showing a returning beam from a plurality of HOEs.

Formed on the concave surface of the primary mirror 12 are a plurality of HOEs 50. In a presently preferred embodiment 48 HOEs are distributed in a mosaic fashion over the reflecting surface of the primary mirror 12. Each HOE 50 diffracts, to the secondary mirror 14, a sample of the expanded laser beam 18a incident on the primary mirror 12. The plurality of HOE-generated output beam samples, shown as dashed lines in FIG. 1, reflect from the secondary mirror 14 to an Output Transfer Mirror (OTM) 52, and from the OTM 52 to an Outgoing Wave Sensor (OWS) 54. The OTM 52 includes a plurality of mirrors, including a tertiary mirror 52a and a scanning mirror 52b (FIG. 3). The OTM tertiary mirror 52a has a parabolic shape, similar to that of tertiary mirror 16. The OTM scanning mirror 52b is scanned in synchronism with the scanning of retarget mirror 48. In that the scanning operation of the retarget mirror 48 induces a tilt into the laser beam 18a, the operation of the OTM scanning mirror 52b is performed to induce an equal and opposite tilt into the sample beam.

The OWS 54, in conjunction with the HOEs 50, is constructed and operated in accordance with the invention so as to employ both field-bias and focus-bias to generate Hartmann wavefront sensor spot patterns in such a manner as to cancel any change in spot pattern position due to pupil distortion effects.

Figure 2:
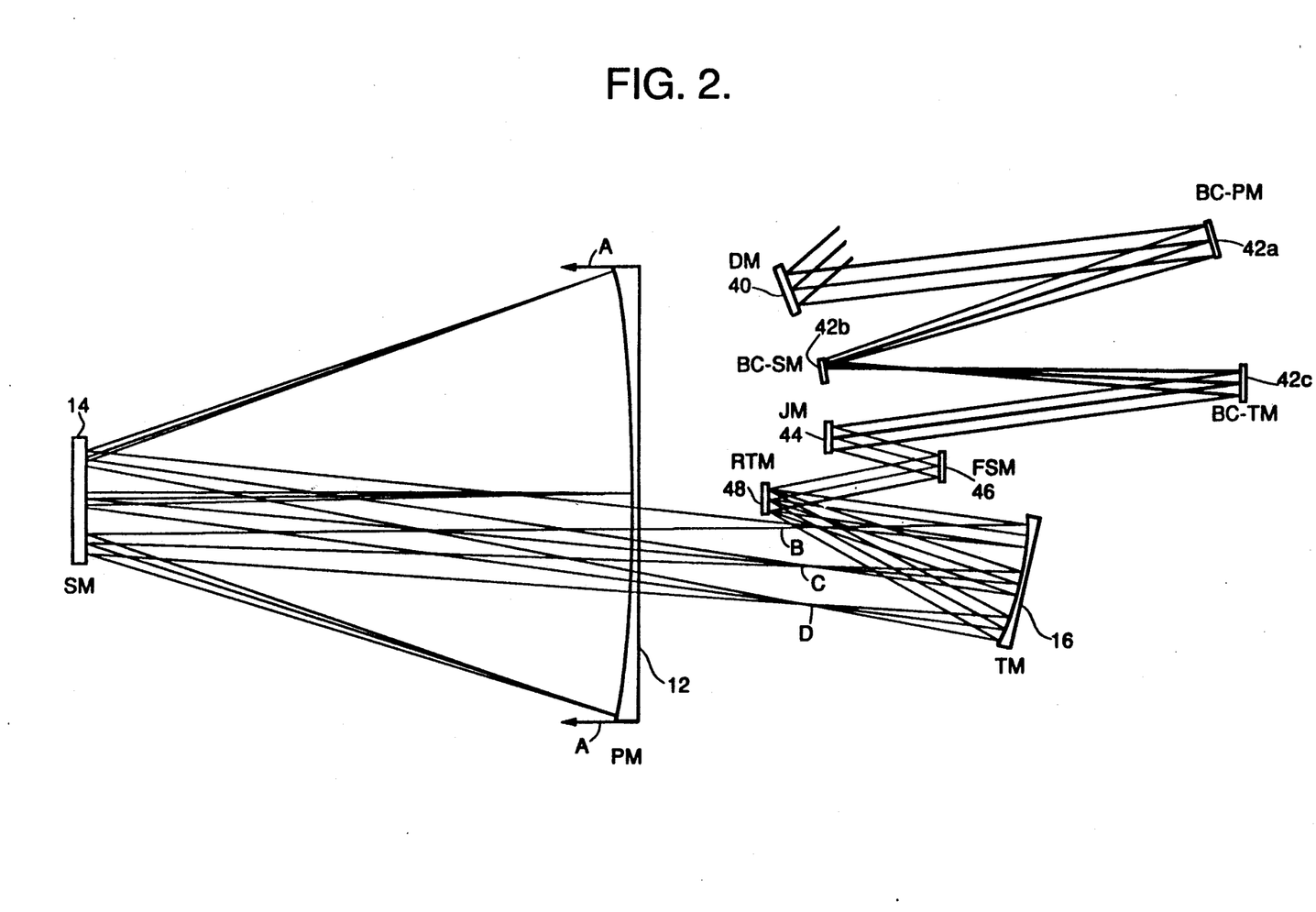
FIG. 2 is a raytrace plot of the optical path of the system of FIG. 1, the raytrace plot showing three FOV angles.

FIG. 2 is a raytrace plot of the optical path of the system 10 of FIG. 1, the raytrace plot showing three FOV angles (designated B,C, and D). In FIG. 2 the beam compactor 42 is shown to be a three mirror off-axis device consisting of mirrors 42a, 42b, and 42c.

FIG. 3 is a raytrace plot showing the outgoing beam A, as in FIG. 2, and further showing the sample beam (E) from a plurality of the HOEs 50. FIG. 3 shows that the tertiary mirror 16 is located on one side of an optical axis (OA) of the system 10, while the OTM tertiary mirror 52a is disposed on an opposite side of the OA. In that the retarget mirror 48 and the OTM scanning mirror 52b cannot occupy the same point, the optical train of the wavefront sensor is folded, by a flat mirror, away from the optical axis (OA) by an amount sufficient to offset the OTM scanning mirror laterally from the OA such that both scan mirrors are clear of one another. The folding flat resides inside the central hole of the primary mirror 12, to one side of the scan mirrors, such that it intercepts and redirects the wavefront sensor sample beams.

The sample beam E is directed by the OTM mirrors 52a and 52b to the OWS 54, which includes a transfer lens assembly (transfer lens) 54a and a radiation detector array 54b. In that the output wave sensor 54 and the BEX 2 share the primary mirror 12 and secondary mirror 14, the output wavefront sensor 54 optical path is complementary to the BEX 2 optical path, and low aberration performance is provided in both paths. Furthermore, in that the OTM tertiary mirror 52a is also a parabola, similar in shape to the tertiary mirror 16, the OWS optical path provides a retro-null characteristic to the OWS 54, and results in an optical system relatively free of optical aberrations at the image focal plane of the transfer lens 54a. As a result, there is provided a wide FOV wavefront sensor optical path having minimized aberration. This is significant, in that aberration in a Hartmann wavefront sensor results in spurious motions of the spot images at the focal plane, the spot images resulting from the transfer lens 54a focussing each of the incident sample beams. Although the spot motions are repeatable, it is difficult, in practice, to differentiate these spot motions from th typically much smaller spot motions that result from the outgoing wavefront aberrations that the sensor is intended to measure.

An additional complication in realizing a wide FOV optical system results from the fact that in such a system an image of the aperture stop (pupil) experiences distortion over the FOV. As was noted above, in the system 10 the primary mirror 12 is the aperture stop. The image of the primary mirror 12, along with the images of the HOEs 50, appears at the retarget mirror 48, the OTM 52, and the deformable mirror 40. As a result, an image of the pupil also lies at each of these locations.

Figure 4A:
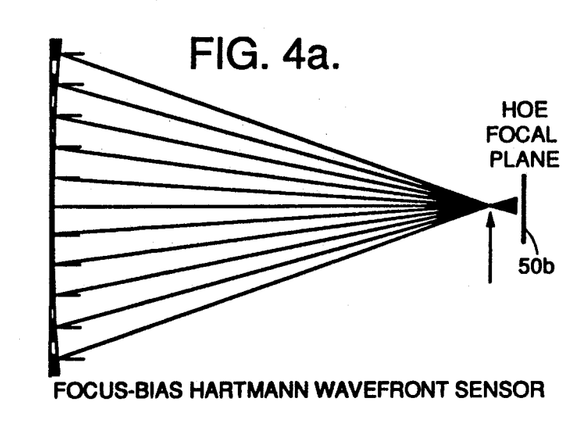
FIG. 4a illustrates a focus-biased Hartmann wavefront sensor.
Figure 4B:
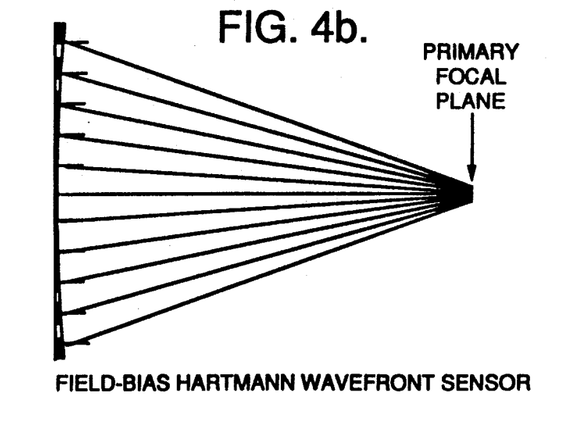
FIG. 4b illustrates a field-biased Hartmann wavefront sensor.
Figure 5A:
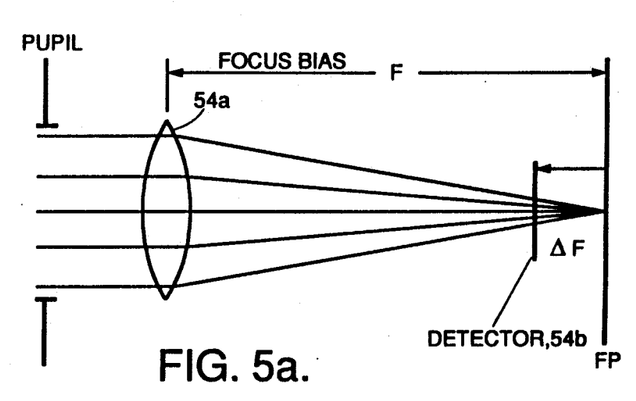
FIG. 5a illustrates a focus-bias applied to a Hartmann OWS.

FIGS. 4a, 4b, 5a, and 5b illustrate methods for spreading apart the HOE spot images 50a at a plane of the radiation detector array 54b. The spot images 50a must be adequately separated from one another in order to unambiguously measure their positions. FIGS. 4a and 5a illustrate the effect of the introduction of focus-bias.

Focus-bias is introduced by displacing the plane of the detector array 54b, that is the radiation responsive surface, in front of or in back of the focal plane (FP) of the transfer lens 54a. In FIG. 5a this detector shift is indicated by the term delta F. However, displacing the radiation detector 54b off of the transfer lens 54a focal plane results in the spot image becoming blurred. This is undesirable in that it decreases the accuracy of spot position measurement.

Figure 5B:
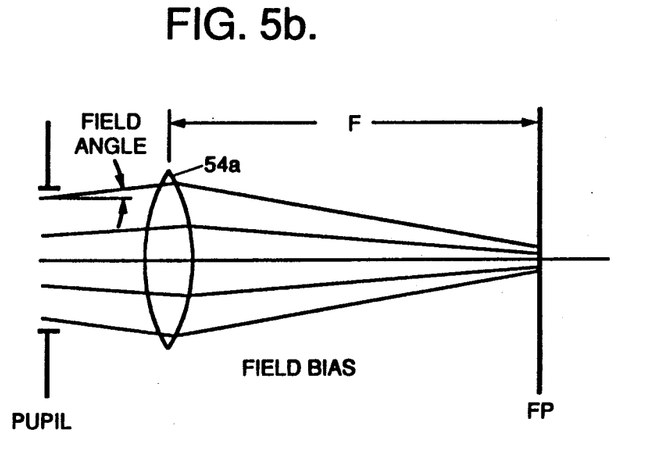
FIG. 5b illustrates a field angle bias applied to a Hartmann OWS.

FIGS. 4b and 5b illustrate the effect of introducing field angle bias. Field angle bias is introduced either by adding tilt to the design of each HOE 50, or by displacing the HOE 50 a distance away from a nominal position. It should be noted that the addition of tilt to the HOE, and physically shifting the position of the HOE, have the same optical effect. However, the introduction of only field-bias still results in an apparent shift of spot position due to pupil distortion at different FOVs.

Figure 6:
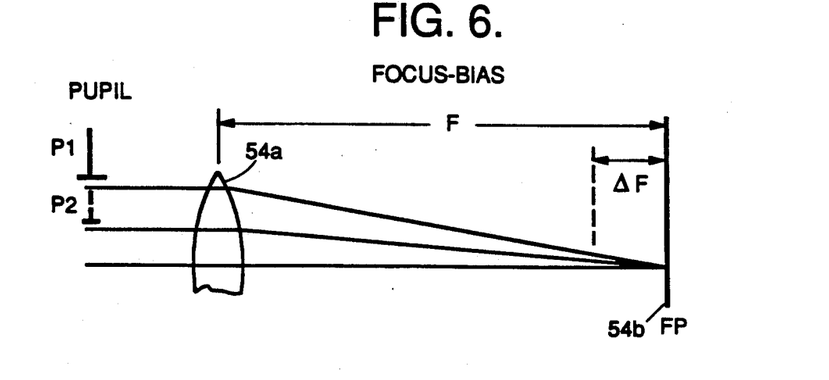
FIGS. 6 and 7 illustrate an effect of pupil distortion on focal plane spot image position shifts, with FIG. 6 illustrating the effect of pupil distortion for a focus-biased wavefront sensor, and FIG. 7 illustrating the effect of pupil distortion for a field-biased wavefront sensor.
Figure 7:
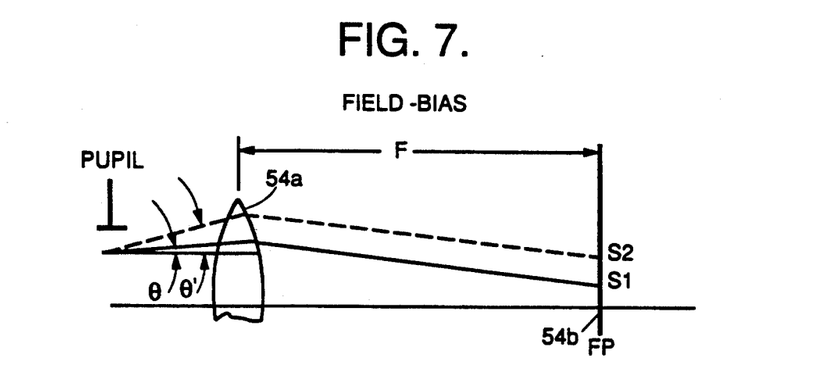

FIGS. 6 and 7 illustrate an effect of pupil distortion on focal plane spot image position shifts, with FIG. 6 illustrating the effect of pupil distortion for a focus-biased wavefront sensor and FIG. 7 illustrating the effect of pupil distortion for a field-biased wavefront sensor.

As can be seen in FIG. 6, as the pupil appears to change from a first position P1 to a second position P2, that is become smaller, the spot image changes at the plane of the focus-biased detector array 54b. As the apparent size of the pupil decreases the effect is to provide a smaller spot pattern. FIG. 7 shows an opposite effect that results from pupil distortion caused by an angular magnification change as a function of field angle. At a first field angle ($\theta$) the spot image strikes the detector array 54a, positioned at the focal plane (FP) of the transfer lens 54a, at point S1. At a second field angle ($\theta'$) the spot image strikes the detector array 54a at point S2. A decrease in pupil size is equivalent to a higher magnification by the wavefront sensor optical train and, as a result, $\theta'$ is greater than $\theta$. Thus, as pupil size decreases a larger spot pattern is obtained, which is the opposite effect to the focus-biased detector array 54b of FIG. 6.

In accordance with this complimentary relationship between pupil size and spot pattern size, and in accordance with an aspect of the invention, the use of both field-bias and focus-bias is employed to generate a spot pattern for a Hartmann wavefront sensor so as to provide for a minimal spot pattern change due to pupil distortion effects over the FOV of the system 10.

Figure 8:
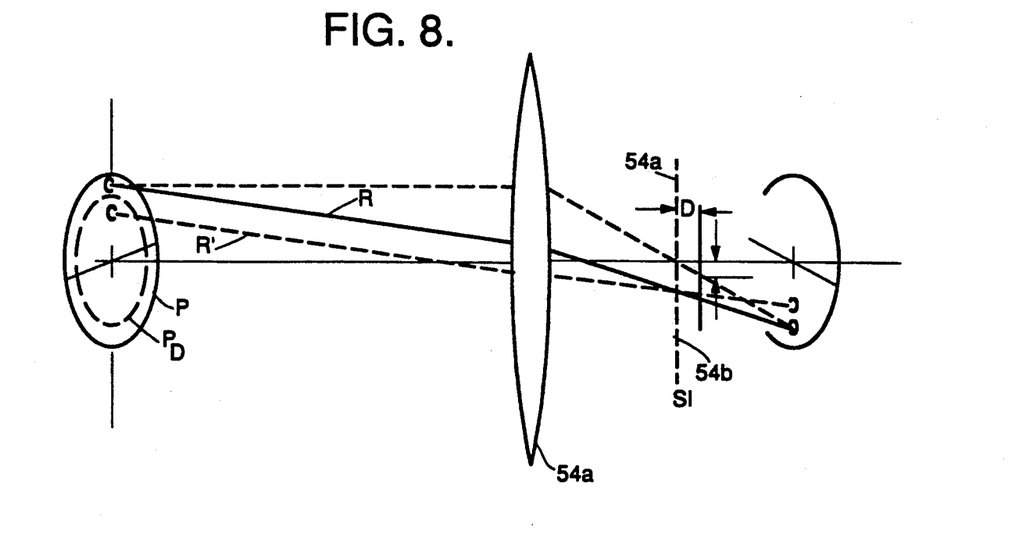
FIG. 8 depicts the optical paths of a HOE beam at two different FOV angles, and illustrates, in accordance with an aspect of the invention, the use of a combination of focus-bias and field-bias to effectively cancel a movement of a spot image at a plane of a radiation detector array.

FIG. 8 depicts the optical paths of a HOE 50 sample beam at two different FOV angles and illustrates, in accordance with this aspect of the invention, the use of a combination of focus-bias and field-bias to effectively cancel a movement of a focal plane spot.

In FIG. 8, P designates an image of the entrance pupil and $P_D$ designates a distorted image of the entrance pupil at a different field location. The image, and apparent location, of the HOE 50 can also be seen to change between the two pupil images, with the dashed ray R' indicating the resulting HOE beam after distortion. The solid ray (R) represents the undistorted HOE beam. The exit pupil image illustrates an apparent shift in the HOE 50 image due to the pupil distortion.

In accordance with the invention, the HOE 50 is provided with a prescribed amount of field-bias angle and a prescribed amount of optical power. The optical power is selected so as to sharply focus the HOE image at the plane of the focus-biased detector array 54b. This arrangement provides for the spot image (SI) to remain at approximately the same position on the detector array 54b. That is, the field-bias angle and optical power provided at the HOE 50, in conjunction with the focus-bias resulting from the displacement of the detector array 54a away from the FP, results in a cancellation of HOE spot image motion at the detector plane due to pupil distortion.

Referring again to FIG. 1, the spot-corrected image is output from the OWS 54 and is provided to the command and control computer 41. As a result of the effective cancellation of spot shifts due to pupil distortion, any remaining spot shift is due to aberration of the outgoing wavefront A. The command and control computer 41 measures the spot shift for each of the HOEs 50 over the FOV and generates a suitable command signal to the actuators 40a of the deformable mirror 40 so as to cause an equal and opposite aberration in the laser beam 18a. This induced aberration thus cancels the aberration in the output beam A, resulting in an aberration-free output beam A from the BEX 2.

In an exemplary embodiment of the invention each of the 48 HOEs 50 is comprised of a four centimeter diameter circular patterned surface region of the primary mirror 12. The wavefront encoded over the primary aperture is primarily tilt second order with a small level of fourth order. That is, the wavefront is mainly tilted and defocussed. Each HOE 50 forms a relatively small region of the wavefront encoding over the entire primary aperture. The transfer lens 54a is a forward aperture stop, 3-element lens defined as F/5.5 (F/83 for each HOE 50), 183 millimeter EFL, and a 1.6 degree FOV. The detector 54b is a 122 by 122 array comprised of 80 micron square pixels.

Further by example, to achieve focus-bias the detector 54b is positioned approximately 26 centimeters behind the nominal focal plane of the transfer lens 54a, and a corresponding amount of optical power is added to each HOE 50 so as to maintain sharp spot images on the detector 54b. To achieve field-bias, each HOE 50 is shifted away from a nominal position by a predetermined distance.

For the described configuration, each average spot image corresponds to approximately three pixels of the detector 54b and lies within an 8 × 8 square grid pattern. Spot pattern distortion over the full FOV is typically less than 3%.

Prescriptions of HOEs are given in terms of a desired phase accumulation vs. a radial distance from the HOE center. A ruling line is exposed at any location where an integer amount of phase has accumulated. Therefore, the pattern of rulings of a HOE can be considered as a contour map of the additional phase it will contribute. If this phase contribution is bowl-shaped over the HOE (squared relation to y-axis), it causes a shift in the focal plane (defocus). If the phase contribution resembles a tilted plane, it shifts the focal point laterally.

Figure 9:
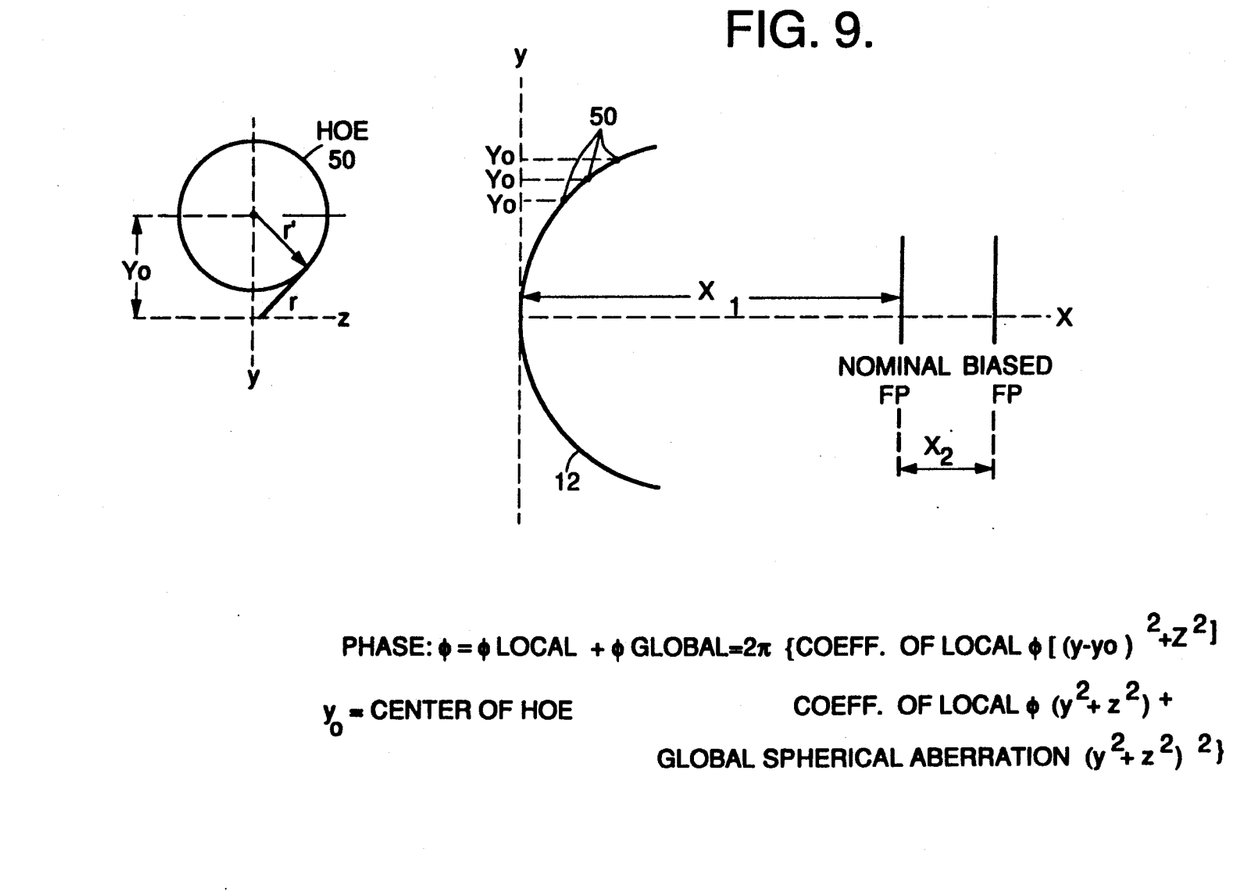
FIG. 9 illustrates a method for prescribing a focus-/field bias configuration for the holographic optical element beam samplers.

FIG. 9 illustrates an exemplary prescription of HOEs for an optimized focus/field bias configuration and for a specific wavelength. Three of the HOEs 50 are shown disposed on the primary mirror 12. $X_1$ is a distance to the nominal focal plane, and $X_2$ is the offset distance of the biased focal plane. The local phase term shifts the plane of best focus from where the HOEs cross the x-axis to the biased focal plane. Differences in the quadratic term of the global phase cause the central rays from the HOEs to cross the x-axis at different locations. As was noted above in the discussion of FIGS. 4b and 5b, field angle bias is introduced either by adding tilt to the design of each HOE 50, or by displacing the HOE 50 a distance away from a nominal position. The addition of tilt to the HOE, and physically shifting the position of the HOE, have the same optical effect.

Having determined a desired amount of optical power and a desired amount of optical tilt for each of the HOEs 50, this information is employed to generate a photolithographic pattern having the desired HOE characteristics. This pattern is used to etch a corresponding pattern into a chrome-coated substrate. This etching process may be performed by conventional photolithographic techniques, such as an electron beam (E-beam) process. The etched chrome-coated substrate becomes a "chrome master" of the HOE pattern for the primary mirror 12 and is employed as a contact print master. The contact print master is transferred to a working mask, which in turn is employed to contact a chrome coating that is applied to the surface of the primary mirror 12. As a result, the pattern for each of the 48 HOEs 50 is transferred or impressed into the surface of the primary mirror 12. The primary mirror 12 is then overcoated with a reflective material, such as silver, and is subsequently further processed in a conventional manner.

While the invention has been particularly shown and described with respect to an exemplary embodiment thereof, it will be understood by those skilled in the art that changes in form and details may be made therein without departing from the scope and spirit of the invention. That is, the use of the invention is not limited to only the low aberration three mirror telescope (TMT) embodiment described in detail above. The use of the TMT is advantageous in that it provides the low aberration optical train for relaying the plurality of HOE sample beams to the transfer optic, with the TMT secondary conveniently directing the HOE beams back through the aperture in the TMT primary.

The provision of a low aberration optical train is significant in that, ideally, the wavefront sensor should not add any aberrations of its own into the sampled wavefront. Thus, the teaching of the invention may be employed to advantage in a large number of different types of optical systems that provide a low-aberration optical path, the optical path being comprised of any number of optical elements and element types, through which the HOE sample beams can be relayed to the transfer lens of the detector assembly.

As such, the scope of the teaching of this invention is not intended to be limited to only the embodiment described above, but is instead intended to be given a scope commensurate with the scope of the claims that follow.

What is claimed is:

1. A wavefront sensor, comprising:
    a plurality of beam sampling means disposed for intercepting a portion of an optical beam that is incident thereon for providing a plurality of sample beams, said plurality of beam sampling means being located at a pupil;
    an optical train for relaying said plurality of sample beams;
    transfer lens means disposed for receiving said plurality of sample beams from said optical train, said transfer lens means focussing said sample beams at a focal plane; and
    detector means disposed in a plane parallel to and offset from said focal plane for detecting said focussed sample beams;
    wherein each of said beam sampling means has an optical power associated therewith for causing an associated one of said sample beams to be focussed by said transfer lens means at the plane of the detector, each of said beam sampling means further having an optical tilt associated therewith for compensating for a distortion of an associated one of said sample beams due to a distortion of said pupil, whereby a combination of the optical power and the optical tilt results in a location of the associated one of the sample beams at the plane of the detector being primarily a function of an aberration of said optical beam, and not primarily a function of a distortion of said pupil.

2. A wavefront sensor as set forth in claim 1 wherein each of said plurality of beam sampling means is comprised of a holographic optical element that diffracts a portion of said optical beam that is incident thereon.

3. A wavefront sensor as set forth in claim 1 wherein the pupil is coincident with a primary mirror of a beam expander, said beam expander further having a secondary mirror and a tertiary mirror arranged in such a manner that said primary mirror receives said optical beam from said tertiary mirror via said secondary mirror for providing an expanded output beam.

4. A wavefront sensor as set forth in claim 3, wherein said optical train includes said secondary mirror.

5. A wavefront sensor as set forth in claim 4, wherein said primary mirror is a paraboloid, wherein said secondary mirror is a hyperboloid, wherein said tertiary mirror is a paraboloid, and further including a transfer mirror means disposed for relaying with low intrinsic aberration said sample beams from said secondary mirror to said transfer leans means, and wherein said transfer mirror means includes a parabolic mirror having a shape similar to a shape of said tertiary mirror.

6. A wavefront sensor as set forth in claim 5 wherein said tertiary mirror and said parabolic mirror of said optical transfer mirror means are disposed on opposite sides of an optical axis that passes through said primary mirror and said secondary mirror.

7. A wavefront sensor for use with a beam expander of a type having a primary mirror, a secondary mirror, and a tertiary mirror, said primary mirror receiving an optical beam from said tertiary mirror via said secondary mirror and providing an output beam, said primary mirror defining a pupil of the beam expander, said wavefront sensor comprising;
    a plurality of holographic optical elements disposed on a surface of said primary mirror for intercepting a portion of the optical beam that is incident thereon for providing a plurality of sample beams;
    an optical train for relaying said plurality of sample beams;
    transfer lens means disposed for receiving said plurality of sample beams from said optical train, said transfer lens means focussing said sample beams at a focal plane; and
    detector means disposed in a plane parallel to and offset from said focal plane for detecting said focussed sample beams;
    wherein each of said holographic optical elements has an optical power associated therewith for causing an associated one of said sample beams to be focussed by said transfer lens means at the plane of the detector, each of said holographic optical elements further having an optical tilt associated therewith for compensating for a distortion of an associated one of said sample beams due to a distortion of the pupil, whereby a combination of the optical power and the optical tilt results in a location of the associated one of the sample beams at the plane of the detector being primarily a function of an aberration of said optical beam, and not primarily a function of a distortion of said pupil.

8. A wavefront sensor as set forth in claim 7, wherein said optical train includes said secondary mirror.

9. A wavefront sensor as set forth in claim 8, wherein said primary mirror is a paraboloid, wherein said secondary mirror is a hyperboloid, wherein said tertiary mirror is a paraboloid, and wherein said optical train further includes transfer mirror means disposed for relaying said sample beams from said secondary mirror to said transfer lens means, and wherein said transfer mirror means is a paraboloid.

10. A wavefront sensor as set forth in claim 8 wherein the beam expander forms a portion of a laser beam directive and adaptive system, the system including:
    a laser for generating a laser beam;
    a deformable mirror for reflecting and adjusting the wavefront of said laser beam;

a beam compactor for receiving said laser beam reflecting from said deformable mirror and for relaying said laser beam; and scanning mirror means for receiving said relayed laser beam and for reflecting same at a predetermined orientation to said tertiary mirror for causing said output beam to be pointed in a desired direction.

11. A wavefront sensor as set forth in claim 10 wherein said optical train further includes transfer mirror means disposed for relaying said sample beams from said secondary mirror to said transfer lens means, wherein said scanning mirror means induces a tilt into said relayed laser beam, and wherein said transfer mirror means includes a second scanning mirror means that induces an equal and opposite tilt into said sample beams.

12. A wavefront sensor as set forth in claim 10, wherein said system further comprises:

control means having an input coupled to an output of said optical wavefront sensor and an output coupled to said deformable mirror, said control means being responsive to a shift of the image of the sample beam, as indicated by said detector, for generating a deformable mirror activation signal for generating an aberration in said laser beam that is equal to and opposite the aberration of said output beam.

13. A system for directing laser energy, comprising:
a laser for generating a laser beam;
means for reflecting and adjusting a wavefront of said laser beam;
means for receiving the reflected laser beam and for pointing the laser beam in a desired direction;
beam expander means disposed for receiving the laser beam reflected from said pointing means, said beam expander means expanding the laser beam to provide an output beam, said beam expander having a pupil associated therewith; and
a wavefront sensor, said wavefront sensor comprising,
a plurality of beam sampling means disposed for intercepting a portion of the output beam that is incident thereon for providing a plurality of sample beams;
an optical train for relaying said plurality of sample beams;
transfer lens means disposed for receiving said plurality of sample beams from said optical train, said transfer lens means focussing said sample beams at a focal plane;
detector means disposed in a plane parallel to and offset from said focal plane for detecting said focussed sample beams; wherein
each of said beam sampling means has an optical power associated therewith for causing an associated one of said sample beams to be focussed by said transfer lens means at the plane of said detector means, each of said beam sampling means further having an optical tilt associated therewith for compensating for a distortion of an associated one of said sample beams due to a distortion of said pupil, whereby a combination of the optical power and the optical tilt results in a location of the associated one of the sample beams at the plane of the detector means being primarily a function of an aberration of said optical beam, and not primarily a function of a distortion of said pupil; said system further including
control means having an input coupled to an output of said detector means and an output coupled to said adjusting means, said control means being responsive to a shift of an image of said sample beams, as indicated by said detector means, for generating an activation signal to said adjusting means for generating an aberration in said laser beam that is equal to and opposite the aberration of said output beam.

14. A system as set forth in claim 13 wherein said beam expander means includes a primary mirror, a secondary mirror, and a tertiary mirror, said tertiary mirror receiving the laser beam from said pointing means, said primary mirror receiving said laser beam from said tertiary mirror via said secondary mirror and providing the output beam, said primary mirror being coincident with said pupil.

15. A system as set forth in claim 13 wherein each of said plurality of beam sampling means is comprised of a holographic optical element that diffracts a portion of said output beam that is incident thereon.

16. A system as set forth in claim 14 wherein said optical train includes said secondary mirror and also transfer mirror means disposed for relaying said sample beams from said secondary mirror to said transfer lens means.

* * * * *